Dec. 8, 1964  S. E. WHITEHEAD  3,159,917
VISUAL AID FOR TRAILER HITCH
Filed Nov. 30, 1962  2 Sheets-Sheet 1
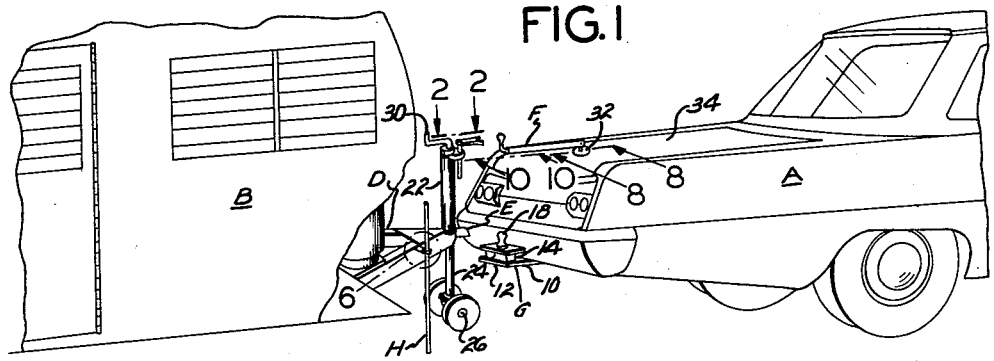
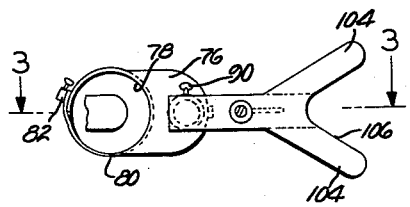
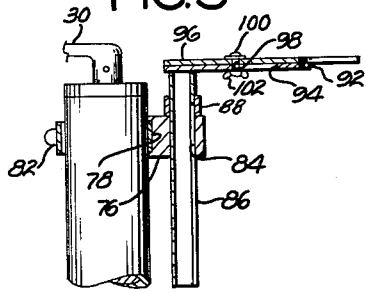
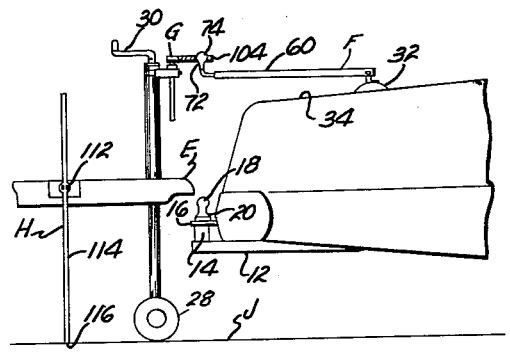
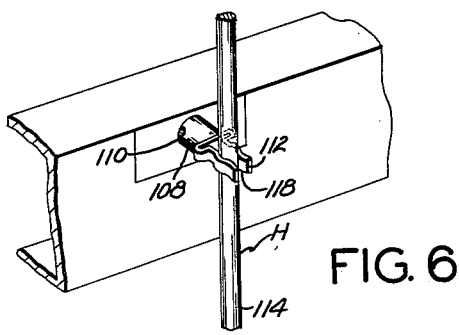
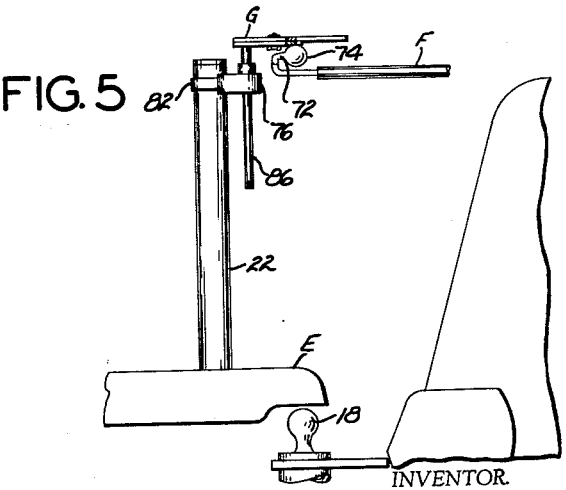
INVENTOR.
STEWART E. WHITEHEAD
BY
William C. Babcock
ATTORNEY Dec. 8, 1964   S. E. WHITEHEAD   3,159,917
VISUAL AID FOR TRAILER HITCH
Filed Nov. 30, 1962   2 Sheets-Sheet 2

INVENTOR.
STEWART E. WHITEHEAD
BY
*William C. Babcock*
ATTORNEY

3,159,917
VISUAL AID FOR TRAILER HITCH
Stewart E. Whitehead, Garden Grove, Calif.
(1844 Haster 151, Anaheim, Calif.)
Filed Nov. 30, 1962, Ser. No. 241,301
5 Claims. (Cl. 33—46)

The present invention relates generally to automative accessories, and more particularly to a device that may be removably mounted on a vehicle and trailer to visually indicate to the driver of the vehicle when the interlocking portions of the trailer hitch are in vertical alignment and may be placed in engagement.

The use of trailers that are drawn by automotive vehicles has increased tremendously in the past few years. During this period a variety of trailer hitches have been evolved, but in the main, the trailer hitch most commonly used is one that includes a rigid ball supported in an upwardly extending position from the rear portion of the automotive vehicle, with a semi-cylindrical socket supported forwardly of the trailer which can removably engage the ball to permit the trailer to be drawn by the vehicle. Although this type of trailer hitch is quite serviceable, the disadvantage thereof, as well as hitches of different structure that are used for drawing a trailer by an automobile is that the driver of the vehicle cannot see the hitch, whereby it is extremely difficult for the driver of the vehicle to vertically align the two hitch portions so that they may be placed in engagement.

This difficulty is so great that even the most skilled driver requires the assistance of a second person positioned outside the vehicle to indicate to the driver whether he has backed or otherwise maneuvered the vehicle into a position where the portion of the hitch mounted on the vehicle is in vertical alignment with that hitch portion supported from the trailer. This vertical alignment of the trailer-supported portion of the hitch is required to permit lowering thereof into engagement with hitch portion supported from the vehicle. Even with a second person giving directions to the driver of the vehicle as to the relationship of the vehicle to the trailer, the backing operation is confusing, and as a result, the engagement of the two hitch portions often is a time-consuming and exasperating experience.

A major object of the present invention is to provide visual guide means by which a driver of a vehicle may back or otherwise maneuver the vehicle into a position where the automotive-supported portion of the hitch is placed in vertical alignment with the trailer-supported hitch portion, with the latter hitch portion when this relative positioning has been attained being lowerable into an engagement with the vehicle-supported portion of the hitch, which operation can be carried out without the instruction of a second person standing outside the vehicle.

A further object of the invention is to provide a visual guide for a trailer hitch, the first portion of which may be removably mounted on the rear portion of a vehicle without in any way defacing or damaging the surface thereof, with the second hitch section being adapted to be removably mounted on the hitch portion of a trailer when needed, and when not in use stored in either the trailer or the automotive vehicle.

Yet another object of the invention is to supply means which not only indicate when the engaging portion of a trailer hitch is in vertical alignment with the engageable means on an automotive vehicle, but which also indicate that the engaging means on the trailer is at a sufficient elevation relative to the engageable means on the vehicle to permit the engagement thereof.

A still further object of the invention is to supply an automotive accessory, which while capable of providing the advantages outlined above, is of relatively simple mechanical structure, and can be fabricated from standard, commercially available materials whereby it may be manufactured and retailed at a sufficiently low price as to encourage its widespread use.

These and other objects and advantages of the invention will become apparent from the following description of a preferred form thereof, and from the drawings illustrating the same, in which:

FIGURE 1 is a perspective view of an automotive vehicle and trailer showing a preferred form of the invention removably mounted thereon, and indicating the manner in which the visual aid is used to indicate to the driver of the vehicle when the two portions of the hitch are in vertical alignment and may be placed in engagement;

FIGURE 2 is a top plan view of the trailer-supported portion of the visual guide;

FIGURE 3 is a fragmentary vertical, cross-sectional view of the trailer-supported portion of the invention taken on line 3—3 of FIGURE 2;

FIGURE 4 is a fragmentary side elevational view of the rear portion of the vehicle and the forward portion of the trailer hitch, and illustrates a second step in the use of the invention;

Figure 7:
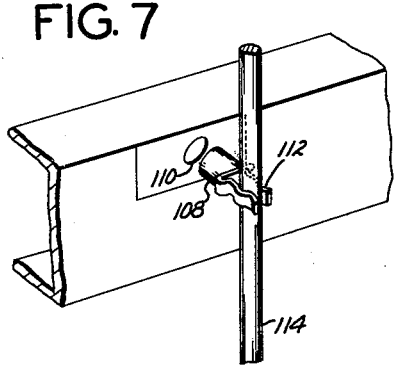
Figure 8:
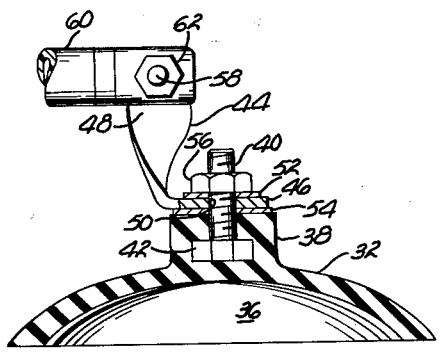
Figure 9:
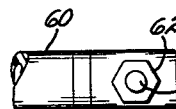
Figure 11:
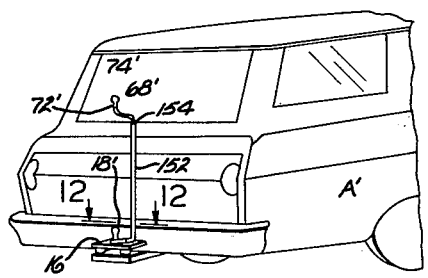
Figure 10:
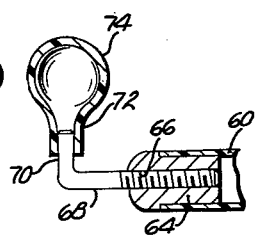
Figure 12:
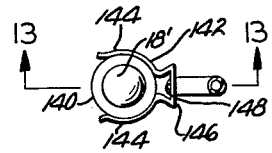
Figure 13:
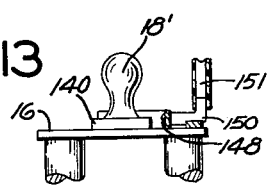

FIGURE 5 is another fragmentary side elevational view of the rear portion of the vehicle and the forward portion of the trailer hitch which shows how the invention is disposed when it visually indicates to the driver of the vehicle that he has maneuvered the vehicle into a position where the two portions of the trailer hitch are in vertical alignment and the portion of the hitch supported by the trailer can thereafter be lowered into engagement with that portion of the hitch supported by the vehicle;

FIGURE 6 is a perspective view of an elevation-indicating portion of the visual aid that is removably mounted on the trailer hitch to so position the trailer-supported portion of the hitch that the vehicle-supported hitch portion may be placed in vertical alignment prior to engagement thereof, shown on a small scale by the encircled portion designated 6 in FIGURE 1;

FIGURE 7 is a second perspective view of the elevation-indicating portion of the invention illustrating the manner in which it is removably affixed to the forward portion of the trailer;

FIGURE 8 is a fragmentary vertical, cross-sectional view of that portion of the guide which is removably affixed to the vehicle, taken on line 8—8 of FIGURE 1;

FIGURE 9 is an alternate construction of the device shown in FIGURE 8;

FIGURE 10 is a fragmentary vertical, cross-sectional view of the rear of that portion of the invention removably mounted on the vehicle, taken on line 10—10 of FIGURE 1;

FIGURE 11 is a perspective view of a first alternate form of the invention, illustrating the manner by which the same may be mounted on the rear of a station wagon;

FIGURE 12 is a horizontal cross-sectional view of the guide shown in FIGURE 11, taken on line 12—12 thereof; and FIGURE 13 is a vertical cross-sectional view of the first alternate form of the invention taken on line 13—13 of FIGURE 12.

Referring now to the drawings, it will be seen in FIGURE 1 that the invention is illustrated as being used in conjunction with an automotive vehicle A and trailer B. The automobile A is provided with a conventional trailer hitch. The hitch includes a first portion 10 mounted on the rear portion of the vehicle A, and portion 10 includes a rearwardly extending rigid member 12 rigidly affixed to vehicle A. Supports 14 are provided that extend upwardly from member 12, which supports have a flat horizontal base plate 16 mounted on the upper ends thereof. A ball 18 occupies an elevated position above plate 16. Ball 18 is rigidly affixed to plate 16 by a downwardly extending extension 20 thereof, which as shown in the drawings, is in the form of a frustoconical body.

In the conventional manner, V-shaped rigid frame D projects forwardly from trailer B, and the forward apex of this frame supports an inverted socket E which serves as a second portion of the hitch adapted to movably engage the ball 18. The socket E and ball 18 when in engagement, permit the trailer B to be drawn by the vehicle A. Due to the ball and socket engagement of the first and second portions of the hitch, the ball 18 can move in any desired direction relative to the socket E, with the ball 18 and socket E still remaining in engagement. In the conventional hitch as above described, means (not shown) are provided to prevent inadvertent displacement of the socket E from the ball 18, but inasmuch as they do not constitute a part of the present invention, such means are not illustrated in the patent drawings.

To hold the trailer B in a stable horizontal position when it is not being drawn by a vehicle, the apex of frame D supports an upwardly extending cylinder 22, which in turn supports a downwardly extending, vertically movable rod 24 having an axle 26 affixed to the lower end thereof. Axle 26 rotatably supports one or more small wheels 28. Rod 24, by means not shown located within the confines of the cylinder 22, can be raised or lowered by rotating a crank 30 or the like.

When it is desired to connect the trailer B to the automobile A, the socket E is elevated above the ball 18 by manipulation of the crank 30, and after the ball is in vertical alignment with the socket E, the crank is used to lower the socket into a position where it engages the ball and removably interlocks therewith. The difficulty in carrying out this operation is the primary reason for devising the present invention. As will be apparent from an inspection of FIGURE 1, the ball 18 and socket E are not visible to the driver of the vehicle A as he attempts to maneuver the vehicle into a position where the ball and socket may be brought into vertical alignment, and consequently the vertical positioning thereof must be accomplished by trial and error.

The visiual aid that eliminates the difficulty of manuvering a vehicle A into a position where it can be connected to a trailer B by means of the hitch, includes a first portion F that is removably affixed to the rear portion of the vehicle, and a second portion G which is removably affixed to the upper portion of the cylinder 22. Portion F of the guide, as may best be seen in FIGURES 1, 4 and 8, includes a vacuum cup 32 fabricated from a resilient material such as rubber, or the like. When the vacuum cup 32 is forcibly pressed into contact with the upper rear surface 34 of a vehicle A, a partial vacuum is formed within the confines 36 of the cup, whereby the cup is removably held in gripping contact with the surface 34.

The cup 32 develops into an upwardly extending boss 38, which supports a screw 40 in an inverted position, with the head 42 of the screw and a portion of the shank thereof being embedded in the boss. An L-shaped rigid member 44 is provided, comprising a horizontal leg 46 and a substantially vertical leg 48. A bore 50 is formed in leg 46 and engages the free, upwardly extending portion of screw 40. Leg 46 is preferably disposed between two washers 52 and 54 through which screw 40 extends.

A nut 56 is threaded to the screw 40, and when this nut is tightened, it holds the L-shaped member 44 at any desired angle in a horizontal plane relative to the vacuum cup 32. A transverse bore (not shown) is formed in leg 48, through which a screw 58 extends. Screw 58 also extends through a transverse bore (not shown) formed in a first end portion of an elongate arm 60, which extends rearwardly from leg 48. A nut 62 engages screw 58, and when this nut is tightened, it supports the arm 60 at a desired angular position relative to the surface 34 of the vehicle A. The arm 60 is preferably fabricated from a lightweight tubular material such as plastic, or the like. The rear end of the arm 60 (FIGURE 10) has a plug 64 mounted therein, which plug has a longitudinally extending tapped bore 66 formed therein that receives the threaded portion of an L-shaped screw 68. The upwardly extending leg 70 of screw 68 serves as a mounting for a resilient member 72, with the upper portion 74 of member 72 being in the shape of a ball.

The second portion G of the visual aid is best seen in FIGURES 1-3 inclusive, and includes a block 76 having a curved concave rear face 78. A resilient band 80 is provided that encircles the upper portion of cylinder 22, with this band being provided with manually actuatable adjusting means 82. When the means 82 are adjusted to tighten band 80, the band frictionally grips the surface of cylinder 22 to hold the band at a desired elevation thereon. Face 78 of block 76 is affixed to band 80 by conventional means, and the band serves to hold the block 76 at a desired elevation on cylinder 22 in the manner shown in FIGURE 3. A vertically extending bore 84 is formed in the forward portion of block 76 in which a rigid tube 86 is disposed. A collar 88 is mounted on the upper surface of block 76 and vertically aligned with bore 84, which collar has a tapped bore (not shown) formed therein that is threadedly engaged by a thumbscrew 90. When the thumbscrew 90 is tightened, the inner end thereof bears against the external surface of tube 86, and holds the tube at a desired position relative to block 76.

The tube 86 supports a first forwardly extending rigid elongate member 92 on the upper end thereof, and a longitudinally extending slot 94 is formed in member 92. A second rigid member 96 is provided that rests on the first member, and is longitudinally movable relative thereto. A bore 98 is formed in member 96 through which a screw 100 extends downwardly to pass through slot 94. A wing nut 102 engages the lower threaded portion of screw 100, which nut when tightened, locks member 96 in a desired position relative to the first member 92 (FIGURE 3). The forward end of the second member 96 develops into two outwardly diverging legs 104 which define a V-shaped space 106 therebetween, the purpose of which will be explained in detail hereinafter.

To assure that the socket E is sufficiently elevated to clear the ball 18 while the vehicle A is being maneuvered into a position to place the ball under the socket E, an elevation-measuring device H illustrated in FIGURES 1, 4 and 6 is provided. This measuring device H is utilized when the vehicle A and trailer B are positioned on an inclined surface or rough terrain. Device H includes a plug 108 which may be removably inserted in an opening 110 formed in the V-shaped frame D, as best seen in FIGURES 1 and 7. A resilient clip 112 extends outwardly from plug 108 and is adapted to frictionally engage an elongate rod 114. When the socket E of trailer B is raised upwardly sufficiently to clear the ball 18 at the time the vehicle A and trailer are being separated from one another, the rod 114 is lowered until the lower end 116 thereof contacts the ground surface. That portion of rod 114 within the confines of clip 112 is marked by a piece of tape 118 affixed thereto. Thereafter the rod 114 may be removed from the clip 112 and the socket E lowered by means of the crank 30, with the assurance that the socket can again be raised to an elevation sufficient to clear the ball 18 simply by reinsertion of the rod in the clip and placing the tape 118 within the confines of the clip.

The operation and use of the invention are relatively simple. First portion F of the invention is mounted on vehicle A (FIGURE 4) and second portion G on cylinder 22, when the socket E and ball 18 are in engagement. Vacuum cup 32 is removably mounted on surface 34 in such a position that the resilient member 72 is disposed rearwardly from the vehicle A. Removable marks (not shown) or other visual indicating means are provided on the surface 34 to indicate the precise positioning of vacuum cup 32 thereon so that it can again be so disposed for reasons to be later explained.

The second portion G of the invention is removably mounted on cylinder 22 by use of band 80 and adjusting means 82. Wing nut 102 is loosened, and the second member 96 adjusted longitudinally relative to first member 92 to place legs 104 in the position shown in FIGURE 5. With the legs 104 in this position, the resilient member 72 will be deformed forwardly inasmuch as the upper portion 74 thereof is in contact with the under side of second member 96. The wing nut 102 is then tightened to hold the legs 104 in the position described.

Thereafter, the socket E may be raised out of engagement with ball 18 by use of crank 30, and the vehicle A driven away from the trailer B. To prevent the first portion F of the invention from being lost or stolen during use of the vehicle A, portion F is preferably removed from surface 34 and stored in either the vehicle or trailer B until needed again. If the vehicle A and trailer B are located on sloping ground or uneven terrain, the elevation measuring device H is preferably employed in the manner previously described.

When it is desired to re-connect the vehicle A to the trailer B by use of the ball 18 and socket E, the socket is elevated to a position where it will clear the ball 18 by means of the crank 30. Positioning of the socket E for this purpose may be gauged either visually or by use of the elevation measuring device H. Rod 114 is slidably mounted in the clip 112, and the crank 30 is used to raise the socket E until the socket is at such elevation that the lower end 116 of the rod can contact the ground surface J when the tape 118 is situated within the confines of the clip 112.

After the vacuum cup 32 has been removed from surface 34, it is again positioned thereon in the precise location it formerly occupied. Repositioning of cup 32 on surface 34 is achieved by means of marks (not shown) placed on the surface. The first portion F of the invention and the second portion G thereof are then visible to the driver of the vehicle A. The driver then backs or otherwise maneuvers the vehicle A relative to the trailer B to position the upper portion 74 of the resilient member 72 within the diverging space 106 defined by the legs 104, as shown in FIGURE 4. When member 72 is so disposed relative to legs 104, the ball 18 is moving towards a position in vertical alignment with the socket E. Further rearward movement of vehicle A relative to trailer B causes the upper portion 74 of member 72 to pass under the forward part of the first and second members 92 and 96, with the resilient member being deformed forwardly as shown in FIGURE 5. When such deformation of member 72 occurs, it is visible to the driver of the vehicle A whereby he knows the socket E is in vertical alignment with the ball 18. The socket E may then be lowered into interlocking engagement with the ball 18 by use of the crank 30 (FIGURES 1, 3 and 4).

In the form of the invention shown in FIGURES 1–5 inclusive, the first and second portions F and G respectively of the invention are in longitudinal alignment with the socket E and ball 18. However, such longitudinal alignment is not necessary, for it is only required that the resilient member 72 occupy a predetermined position relative to the first and second members 92 and 96 when the ball 18 and socket E are vertically aligned. Thus, the first and second members 92 and 96 could be offset from longitudinal alignment with the socket E, as could the first portion F of the invention, whereby the visual aid would operate in the same manner described above. After the first and second portions F and G respectively, of the device have served their intended purpose and the trailer is ready to be drawn for a considerable distance, both the first and second portions, as well as the elevation measuring device H, may be removed from the positions shown in FIGURE 1 and stored. It will be particularly noted that the legs 104 serve as visual aids in the transverse positioning of member 72 so that socket E and ball 18 are in longitudinal alignment and the deformation of member 72 serves to notify the driver of vehicle A that the ball and socket are in transverse alignment. Obviously, when the ball 18 and socket E are both longitudinally and transversely aligned, the socket can be lowered into engagement with the ball.

An alternate design for the vacuum cup assembly shown in FIGURE 6 is illustrated in FIGURE 9. In this form of the assembly, the same arm 60 is employed as is the screw 58 and nut 62 as used in the preferred form, but with the screw 58 engaging a bore (not shown) formed in a rigid member 120. Member 120 is adjustably supported for pivotal movement by disposing the lower portion 122 thereof in a vertically extending slot formed in a bifurcated body 124. A bolt 126 extends transversely through body 124 to engage a bore (not shown) formed in portion 122. The bolt 126 is provided with a nut 128, and by tightening this nut after the member 120 has been adjusted to a desired position relative to the body 124, the member can be so held in this fixed adjusted position. Body 124 is connected to an inverted cup 130 by conventional means 132, such as a bolt, screw, or the like. A permanent magnet 134 is situated within the confines of cup 130, and the magnet is connected to the cup by a screw or other conventional fastening means.

When the alternate form of the visual aid as shown in FIGURE 9 is utilized, it is removably held on the surface 34 due to the magnetic attraction between the steel normally defining the rear body portion of a vehicle A and the magnet 134. Cup 130 can be fabricated from any desired material, but if from a metal, the circumferential edge thereof should be rolled to provide a bead 138 thereon to prevent marking of the surface 34 of vehicle A when the cup is mounted thereon.

A first alternate form of the invention primarily adapted for use with vehicles A' in the form of a station wagon is shown in FIGURE 11. In this form of the guide, a ball 18' is provided that is supported from a circular member 140 mounted on the base plate 16. A resilient clip 142 is provided having two legs 144 which resiliently grip member 140. Clip 142 has a forwardly extending web 146 connected to legs 144, which web also is connected by a screw 148 or other conventional fastening means to an L-shaped rigid member 150 that has an upwardly extending portion 151. A tubular leg 152 extends upwardly from portion 151, as best shown in FIGURE 13. The upper end of leg 152 has a plug 154 mounted therein that supports a Z-shaped member 68'. The rearwardmost portion of member 68' supports a resilient member 72' having an upper portion 74'. Member 72 is, of course, visible to the driver of the vehicle A', and is used in the same manner as the member 72 in vertically aligning the ball 18' with the socket E (not shown).

Although the present invention is fully capable of achieving the objects and providing the advantages hereinbefore mentioned, it is to be understood that it is merely illustrative of the presently preferred embodiments thereof and I do not mean to be limited to the details of construction shown and described, other than as defined in the appended claims.

I claim:

1. A visual aid to assist a driver in maneuvering a vehicle having a first engageable portion of a trailer hitch on the rear part thereof to a position relative to a trailer having a second engaging portion of said trailer hitch on the forward part thereof to so align said engageable and engaging portions that they can be removably engaged, comprising:
- (a) a resilient member capable of being deformed;
- (b) first means for supporting said member rearwardly of said vehicle and at a sufficient elevation as to be visible to said driver of said vehicle;
- (c) a rigid member having two transversely spaced forwardly extending portions which define a space therebetween, with at least the forward portion of said space being sufficiently wide as to permit said resilient member to enter the same without deformation; and
- (d) second means for adjustably supporting said rigid member from said trailer at such a position relative thereto that after said resilient member enters said space and deforms to a predetermined degree due to contact with a portion of said rigid member, said engaging and engageable portions of said hitch are so disposed that they can be removably engaged.

2. A visual aid as defined in claim 1 wherein said first means includes a resilient vacuum cup that can be removably affixed to the rear portion of said vehicle, and further includes:
- (a) an arm supported by said vacuum cup and extends rearwardly beyond said vehicle; and
- (b) a support for said resilient member on the rear portion of said arm.

3. A visual aid as defined in claim 1 wherein said first means includes a permanent magnet of sufficient strength as to remain in a fixed position on a rear steel portion of said vehicle, and further includes:
- (a) an arm supported by said magnet and extends rearwardly beyond said vehicle; and
- (b) a support for said resilient member on the rear portion of said arm.

4. A visual aid as defined in claim 1 wherein said first means includes a resilient clip that removably engages a rear portion of said vehicle, and further includes:
- (a) an elongate member extending upwardly from said clip;
- (b) an arm extending rearwardly from said elongate member; and
- (c) a support for said resilient member on the rear portion of said arm.

5. A visual aid as defined in claim 1 which further includes means for determining whether said engaging means is at a sufficient elevation as to be engageable with said engaging means when said resilient member is moved to a position relative to said rigid member where said resilient member deforms.

References Cited in the file of this patent
UNITED STATES PATENTS
2,815,732    Majors  ---------------- Dec. 10, 1957